United States Patent
Brown et al.

(10) Patent No.: US 6,321,351 B1
(45) Date of Patent: Nov. 20, 2001

(54) METHOD AND APPARATUS FOR DETECTING ERRORS IN DVD DATA

(75) Inventors: Chris T. Brown, Sunnyvale; Tina T. Peng, San Jose; Sheena F. Shi; Arup K. Bhattacharya, both of Sunnyvale, all of CA (US)

(73) Assignee: Oak Technology, Sunnyvale, CA (US)

(*) Notice: Subject to any disclaimer, the term of this patent is extended or adjusted under 35 U.S.C. 154(b) by 0 days.

(21) Appl. No.: 09/270,426

(22) Filed: Mar. 16, 1999

(51) Int. Cl.[7] ............................ G06F 11/00; G11C 29/00; H02H 3/05
(52) U.S. Cl. ............................ 714/704; 714/769; 714/57
(58) Field of Search ................................ 714/752, 758, 714/763, 764, 769, 770, 771, 785, 781, 819, 52, 54, 48, 57, 704

(56) References Cited

U.S. PATENT DOCUMENTS

| | | | |
|---|---|---|---|
| 4,617,664 | * | 10/1986 | Aichelmann, Jr. et al. ......... 714/758 |
| 4,969,139 | * | 11/1990 | Azumatani et al. .................. 369/54 |
| 5,487,077 | * | 1/1996 | Hassner et al. ...................... 714/762 |
| 6,092,231 | * | 7/2000 | Sze ....................................... 714/758 |

* cited by examiner

Primary Examiner—Christine T. Tu
(74) Attorney, Agent, or Firm—Bobbie Truong; John Schippar

(57) ABSTRACT

A method and apparatus for processing data read from a DVD media containing stored data is described. The apparatus includes a DVD media reader for reading data and error information stored on a DVD media, an error processor for determining the number of errors in the read data, and a display means for displaying the number of errors. The method includes the steps of reading actual data from a DVD media, computing a first correction code for the actual data, reading a second correction code from the DVD media, the second correction code pertaining directly to said stored data, and comparing the first and second correction codes to determine whether said actual data needs to be corrected. The method further includes the steps of determining whether the number of errors in the actual data exceeds the number of errors that can be corrected, correcting the actual data if possible, and counting the number of errors that are corrected.

4 Claims, 6 Drawing Sheets

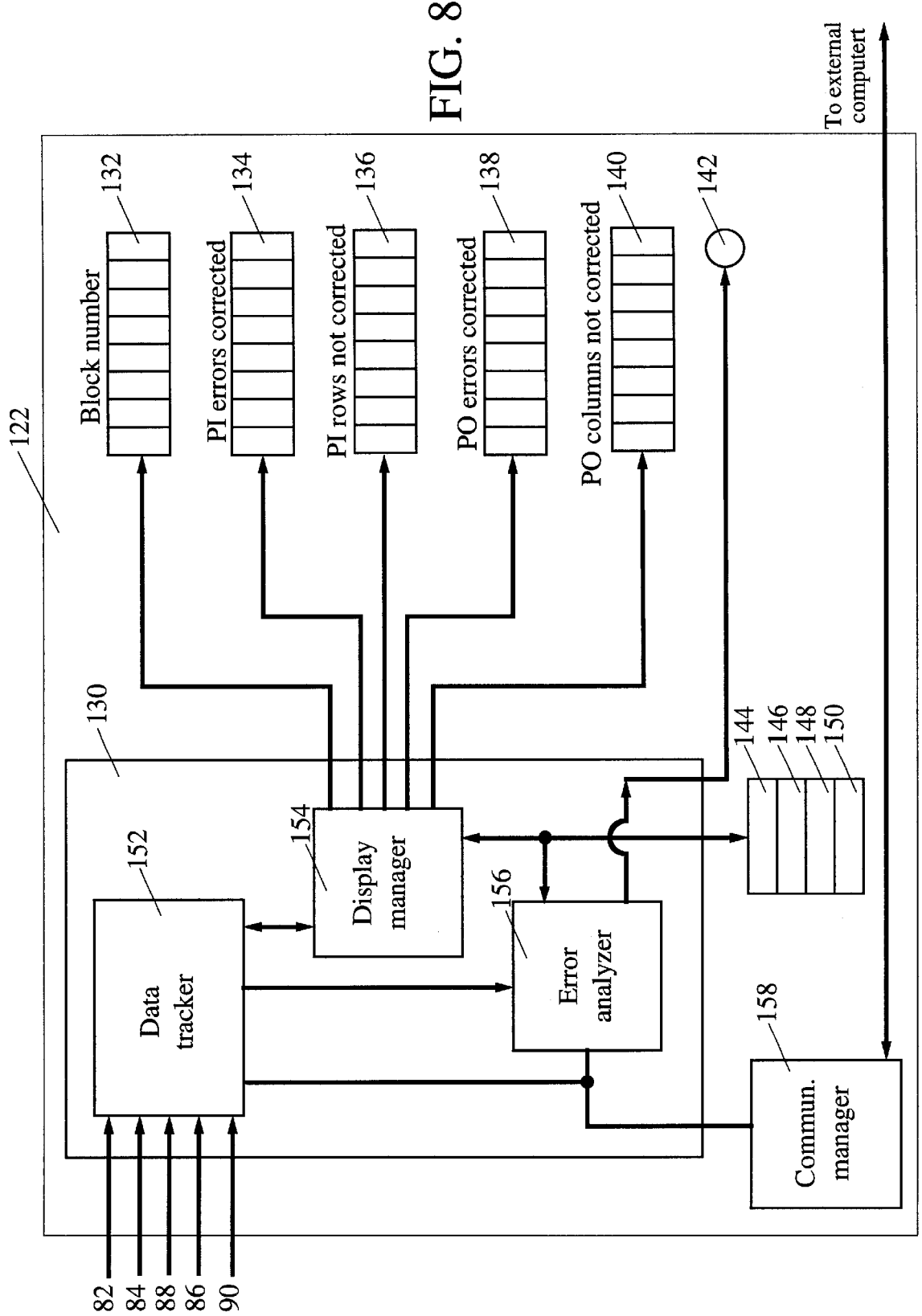

METHOD AND APPARATUS FOR DETECTING ERRORS IN DVD DATA

BACKGROUND OF THE INVENTION

1. Field of the Invention

The present invention relates to electronic systems employing DVD readers. More particularly, the present invention relates to a method and apparatus for presenting DVD media read error data.

2. The Background Art

Modern electronic systems such as video playback machines and computers often employ Compact Disk Read-Only Memory (CD-ROM) or DVD for storing large amounts of data such as video or audio data.

DVD's are a type of storage media utilized for video and audio data as well as large software systems. Like CD-ROM media, a DVD media is read using a player or reader designed for that purpose.

Information is stored on DVD media in digital form, resulting in data that is either a one (1) or a zero (0). Those of ordinary skill in the art are readily aware that DVD media contain areas of high reflectivity (land) and low reflectivity (pit). When read with a laser, a transition from land to pit or from pit to land represents a "1", and all other areas represents a "0".

During the process of writing data to a DVD media, Reed-Soloman error correction codes and other error mechanisms known to those of ordinary skill in the art are also written. When the data is later read back, these correction codes may be compared with actual correction codes which are computed from the actual data read from the DVD to determine whether one or more errors have occurred. Depending on the differences between the correction codes read from the DVD media and the correction codes computed from the actual data, errors in the actual data may be correctable.

In this disclosure, the term "correction code" shall refer to Reed-Soloman correction codes, checksums in general, and any other data structure used by those of ordinary skill in the art to determine if data has been accurately read from a storage media.

Those of ordinary skill in the art are well aware of methods and apparatus for determining whether the data is correctable, and for correcting the actual data. However, the prior art apparatus and methods suffer from unnecessary delays in allowing later processes to utilize information about errors, whether those errors were correctable, and how many errors were corrected.

FIG. 1 is a block diagram of a typical prior art DVD signal processing system.

Referring to FIG. 1, processing system 10 comprises a signal processor 12 which receives data 14 from a DVD media. Processor 12 examines the input data block and determines whether there are errors. If so, processor 12 corrects those errors that are correctable, and then stores the corrected data in memory 16.

FIG. 2 depicts a typical arrangement of a data block after being processed by a DVD signal processor.

Referring to FIG. 2, a typical data block 14 (from FIG. 1) comprises 208 rows (e.g. rows 20, 22) of 182 bytes each. Reading the block from left to right and from top to bottom in sections, each section includes 12 rows of data bytes, each row including 172 actual data bytes plus 10 bytes of correction data information, the correction data relating to the preceding 172 actual data bytes. The correction data at the end of each row is known to those of ordinary skill in the art as inner-code parity (PI) data.

Every thirteenth row in a section includes error data 22 which is commonly called outer code parity (PO) data. Although this correction data is interleaved with actual data, PO data is processed as columns. Thus, just as there are 172 user data bytes and ten PI error data bytes per row, there are 182 columns, each column having 192 user data bytes and 16 error data bytes.

Within every thirteenth row of data beginning with the first row there is a three-byte sector number which identifies the sector number of the data stored therein. Such a sector number is stored in the location depicted in FIG. 2. There are 16 sector numbers within each ECC block. Therefore, a block number is the most significant 20 bits of a 24 bit sector number (the sector number divided by 16), and may be represented as five hexadecimal digits.

The prior art apparatus is useful for its intended purpose of handling and managing PI and PO data and the error rate data produced by signal processor 12. However, there are significant delays which are inherent in the prior art apparatus due to the necessity of storing the data in memory prior to operating on the corrected data. Further, there is no defined method for outputting the error rate data using an efficient data structure for later processing.

It would therefore be beneficial to provide an apparatus for handling and managing error rate information which allows devices needing error data to receive that data in real time.

It would also be beneficial to provide an apparatus which provides DVD error data to devices in a well-defined structure which can be processed efficiently and effectively.

It would also be beneficial to provide an apparatus which provides error information with the corresponding block number so that the data errors and block location may be correlated.

SUMMARY OF THE INVENTION

A method and apparatus for processing data read from a DVD media is described. The apparatus includes a DVD media reader for reading data and error information stored on a DVD media, an error processor for determining the number of errors in the read data, and a display means for displaying the number of errors. The method includes the steps of reading actual data from a DVD media, computing a first correction code for the actual data, reading a second correction code from the DVD media, and comparing the first and second correction codes to determine whether the actual data needs to be corrected. The method further includes the steps of determining whether the number of errors in the actual data exceeds the number of errors that can be corrected, correcting the actual data if possible, and counting and displaying the number of errors that are corrected.

BRIEF DESCRIPTION OF THE DRAWINGS

FIG. 8 is a block diagram showing details of the error-rate display apparatus of FIG. 7.

DETAILED DESCRIPTION OF ONE EMBODIMENT

Those of ordinary skill in the art will realize that the following description of the present invention is illustrative only and not in any way limiting. Other embodiments of the invention will readily suggest themselves to such skilled persons.

Figure 3:
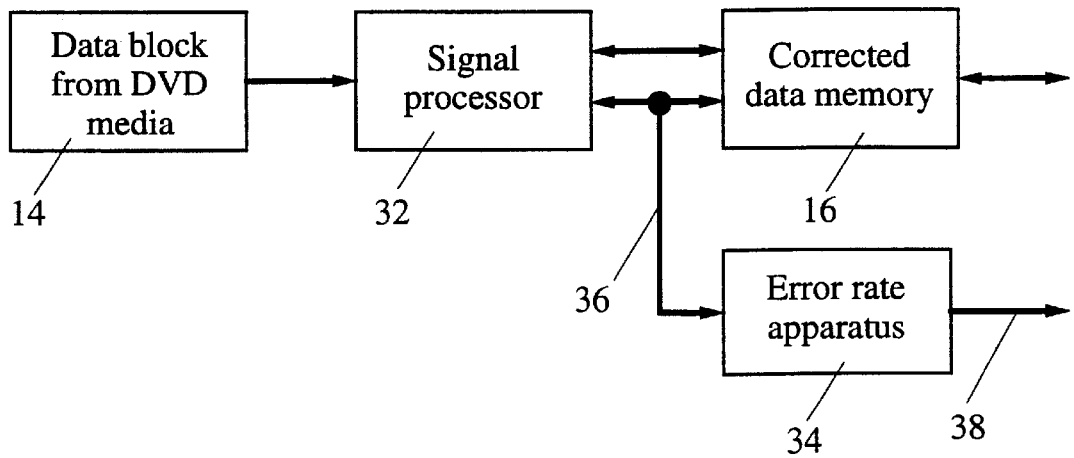
FIG. 3 is a block diagram of a system employing one embodiment of the present invention.

FIG. 3 is a block diagram of a system employing one embodiment of the present invention.

Figure 1:
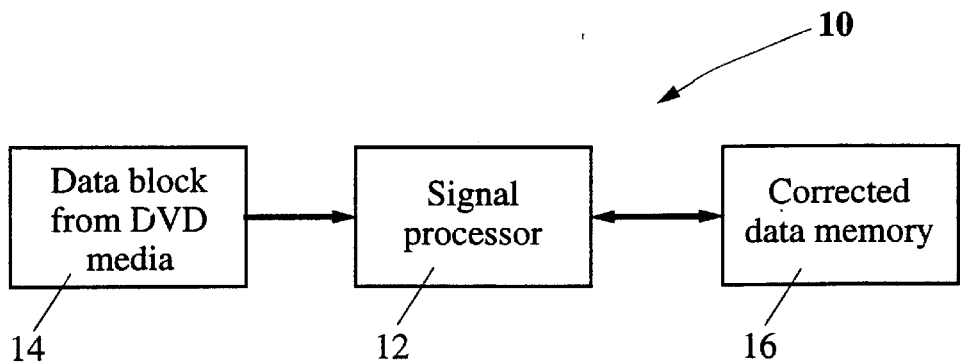
FIG. 1 is a block diagram of a typical prior art DVD signal processing system.

Referring to FIG. 3, system 30 comprises a processor 32 having data block 14 (as first seen in FIG. 1) as an input, and corrected data memory 16 as an output. However, unlike the prior art, instead of the corrected data, PI data, and PO data being transmitted only to memory 16, error rate apparatus 34 also receives error rate data over input lines 36. The output of error rate apparatus 34 is provided on output lines 38. The signals on input lines 36 and output lines 38 each comprise a buse, with each bus having one or more signal lines.

By determining the error content of the data read from the DVD media and then packaging that error content in an efficient serial format which uses only four output lines, the present invention provides error rate information to devices which require it without requiring that those devices have access to memory. Further, since memory read and write operations are not required, the data is accessed more quickly, saving valuable time and allowing the analysis of error information earlier than was possible with the prior art.

Computing correction data corresponding to the actual data read from a DVD media and comparing the result to correction data present in the data read from the DVD media are processes that are known to those of ordinary skill in the art. However, processor 32 additionally tracks the number of errors corrected in each row data set (PI data set) or column data set (PO data set), and then presents the number of corrections, together with other information, to an output data stream.

Processing of PI data for any given data block is accomplished in its entirety and then PO data processing takes place for that same block. Many data blocks are processed in any given session. While error rate apparatus 34 processes PO data for a given block, error rate apparatus 34 processes PI data for the succeeding block, in order to maximize data throughput.

Figure 4:
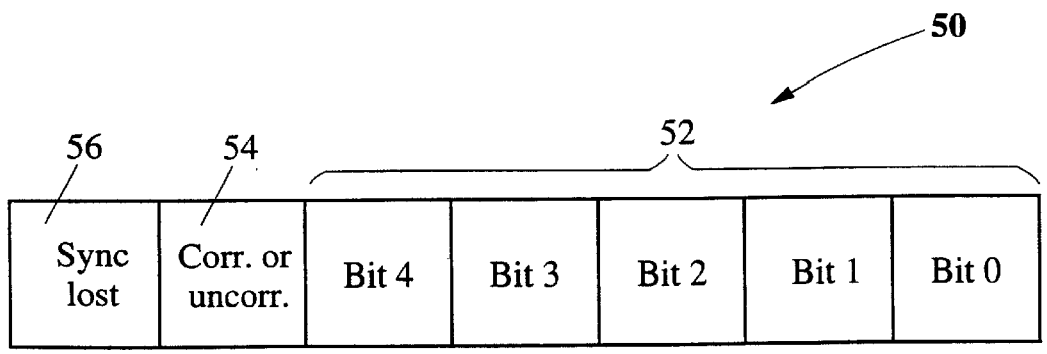
FIG. 4 shows a data structure employed with one embodiment of the present invention.

FIG. 4 shows a data structure employed with one embodiment of the present invention.

Referring to FIG. 4, processor 32 (from FIG. 3), after correcting all correctable data for a given row or column (depending on whether PI or PO data is currently being processed), will provide data structure 50 on its output. Data structure 50 comprises bits 52 representing the number of errors in the read data, bit 54 representing whether the read data had to be corrected, and bit 56 indicating a sync lost condition. A sync lost condition exists when a predetermined number of sectors has been processed without the processor detecting a sync pattern in the read data.

Although in one embodiment bit 54 is high when actual read data must be corrected, and low when the actual read data is correct when read from the DVD media, those of ordinary skill in the art will readily recognize that either logic level (high or low) may represent either condition (corrected or uncorrected), at the discretion of the system designer.

In one embodiment, bit 56, the sync lost bit, is set high when synchronization with the DVD media data stream is lost. Thus, if a given number of consecutive sectors have been processed without the processor detecting a sync pattern (thus indicating the start of a new row of data), the sync lost bit is set high, and further processing of read data is inhibited.

Figure 5:
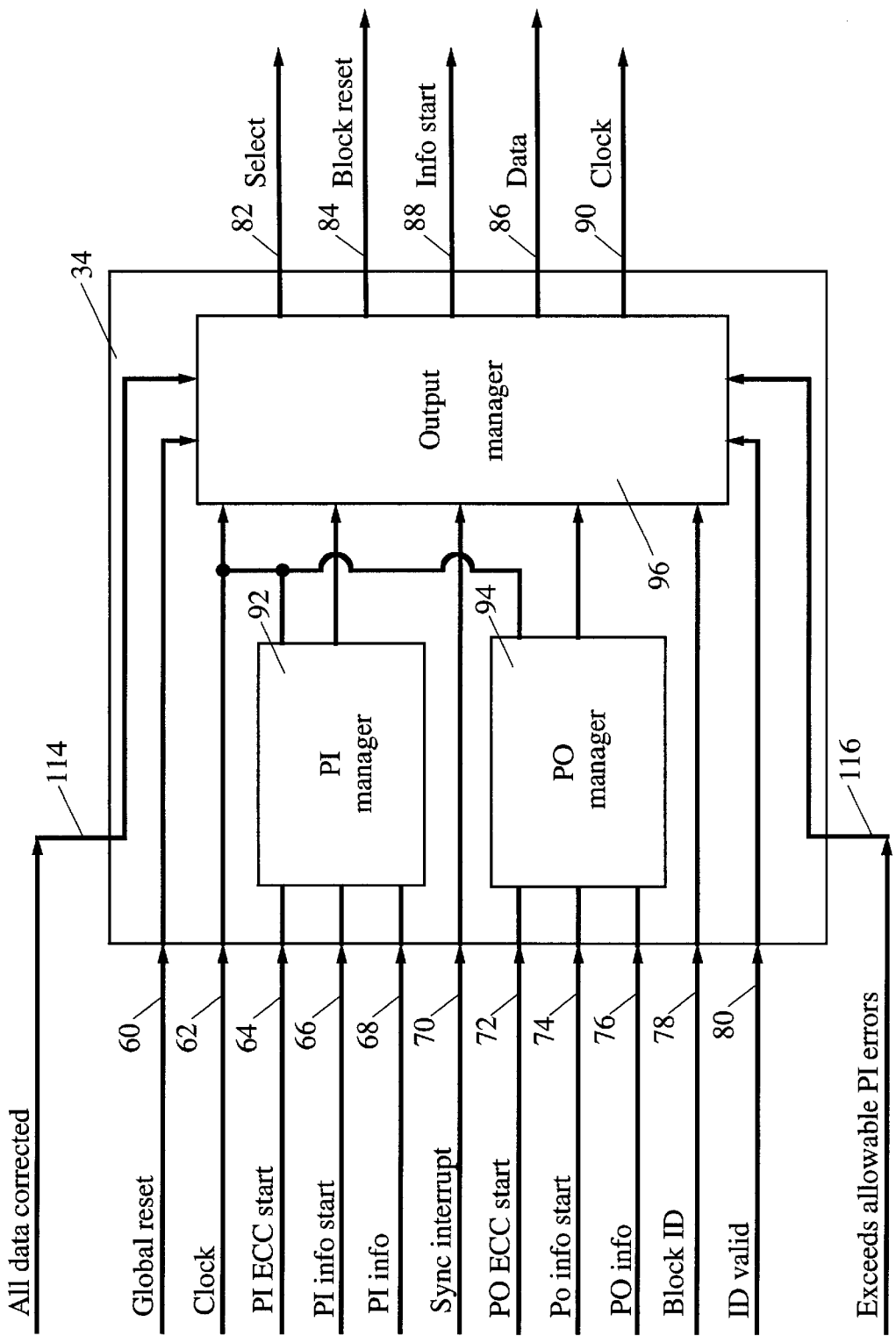
FIG. 5 is a block diagram of one embodiment of the present invention error rate apparatus.

FIG. 5 is a block diagram of one embodiment of the present invention error rate apparatus.

In this disclosure, signals are characterized as being asserted and deasserted. Those of ordinary skill in the art would be readily aware that signals may be asserted high or asserted low depending on the needs of the designer of the system. Correspondingly, a signal may be deasserted low or high, depending on the needs of the designer. Those of ordinary skill in the art will appreciate that systems employing either of the alternatives remain within the scope and purpose of the present invention.

Referring to FIG. 5, error rate apparatus 34 is typically an application-specific integrated circuit (ASIC) having, as inputs from processor 32, a global reset line 60, clock 62, PI ECC start 64, PI info start 66, PI information lines 68, sync interrupt 70, PO ECC start 72, PO info start 74, PO information lines 76, Block ID lines 78 and ID valid line 80. Outputs from error rate apparatus 34 are select line 82, block reset 84, info start 86, data line 88, and clock 90.

Error rate apparatus 34 includes PI manager 92, PO manager 94, and output manager 96 to manage the receipt of PI data, the receipt of PO data, and the timing of output signals respectively.

Global reset line 60, is asserted by processor 32 when the system first initializes, indicating to error rate apparatus 34 that processor 32 is ready to begin transmitting data.

A clock signal is provided by a system clock on clock line 62 to synchronize data transfers between processor 32 and error rate apparatus 34.

Figure 2:
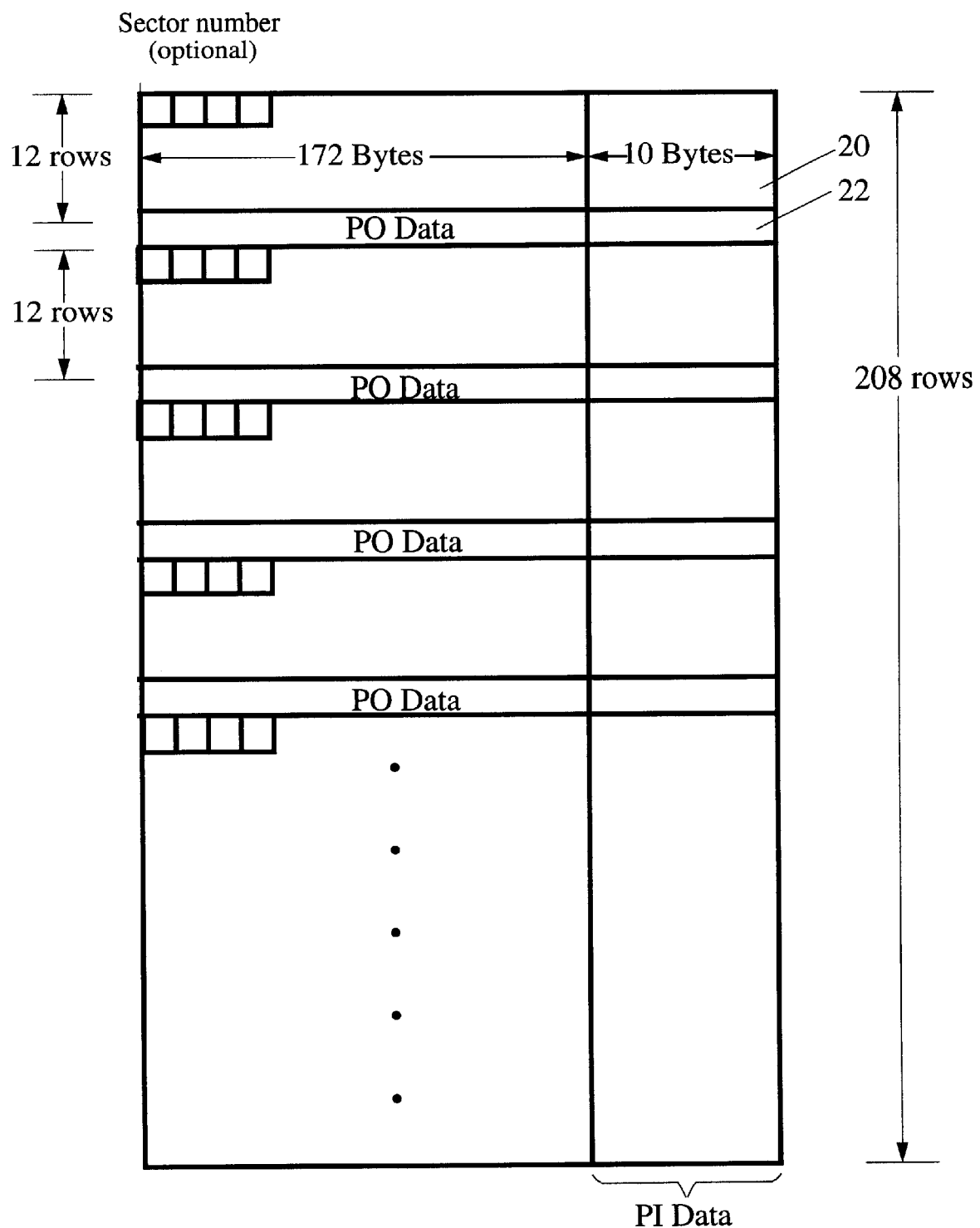
FIG. 2 depicts a typical prior art arrangement of a data block after being processed by a DVD signal processor.

PI ECC start line 64 is asserted for one clock cycle each time processing for a new data block takes place. For example, FIG. 2 represents a typical data block. Each time processing is started for a new data block such as the data block described with respect to FIG. 2, PI ECC start line 64 is asserted for one clock cycle.

PI info start 66 is asserted for one clock cycle each time a new seven-bit PI information is transferred.

PI information lines 68 are asserted or deasserted as required to provide the FIG. 4 data structure which indicates whether data was corrected, how many errors existed, and whether a sync lost condition exists.

Sync interrupt line 70 is asserted by processor 32 when a preset number of data elements have been received without detecting a sync pattern.

PO ECC start line 72, PO Info Start line 74, and PO information lines 76 operate in the same manner as PI ECC Start line 64, PI Info Start line 66, and PI information lines 68 respectively, except that these lines operate on PO data, rather than PI data.

Block ID lines 78 are utilized to transmit the block identifier of the ECC block to which the current data pertains. ID valid line 80 is asserted when the information presented by the processor to error rate apparatus 34 on block ID lines 78 is valid. Alternatively, PI info Start line 66 or PO info Start 74 may be used to trigger acceptance of the data present on the Block ID lines 78, and either of the PI information lines 68 or the PO information lines 76 respectively, depending on whether it is PI or PO data which is being operated upon at the time.

Select line 82 on the output of error rate apparatus 34 is used to indicate the character of data on the output. For example, in one embodiment if PI data is being transferred, select line 82 asserted. In that same embodiment, if PO data is being transferred, select line 82 will be deasserted. Those of ordinary skill in the art would readily recognize that signal lines may be asserted high or low, and that a signal may be asserted or deasserted to indicate a given condition while remaining within the scope and purpose of the present invention.

Block reset line 84 is asserted for one clock cycle when the first piece of PI data corresponding to a data block is transmitted, and also when the first piece of PO data corresponding to a data block is transmitted. Immediately thereafter, the block ID of the data block transmitted by output manager 96 over data line 86.

The determination, by an external device, of whether the block reset signal and the block ID transmitted thereafter pertain to PI or PO data is made by examining the state of the select line 82 at the time the block reset line is asserted. In this example, if select line 82 is asserted at the time the block reset line is asserted, the block ID transmitted thereafter pertains to PI data. Thus, if select line 82 is deasserted at the time the block reset line is asserted, the block ID transmitted thereafter pertains to PO data.

Info start line 88 is asserted by error rate apparatus 34 whenever a PI or PO data stream is to be transferred over data line 88 to an external device.

Clock line 90 is optionally provided at the output of error rate apparatus 34 in order to synchronize the output data with a receiving device. Alternatively, a single clock signal may be provided so that all system components are synchronized.

Those of ordinary skill in the art would readily recognize that power and ground conductors (not shown) must also be provided to the system components in order for them to operate properly. These conductors are not shown in order to avoid complicating this disclosure.

Figure 6:
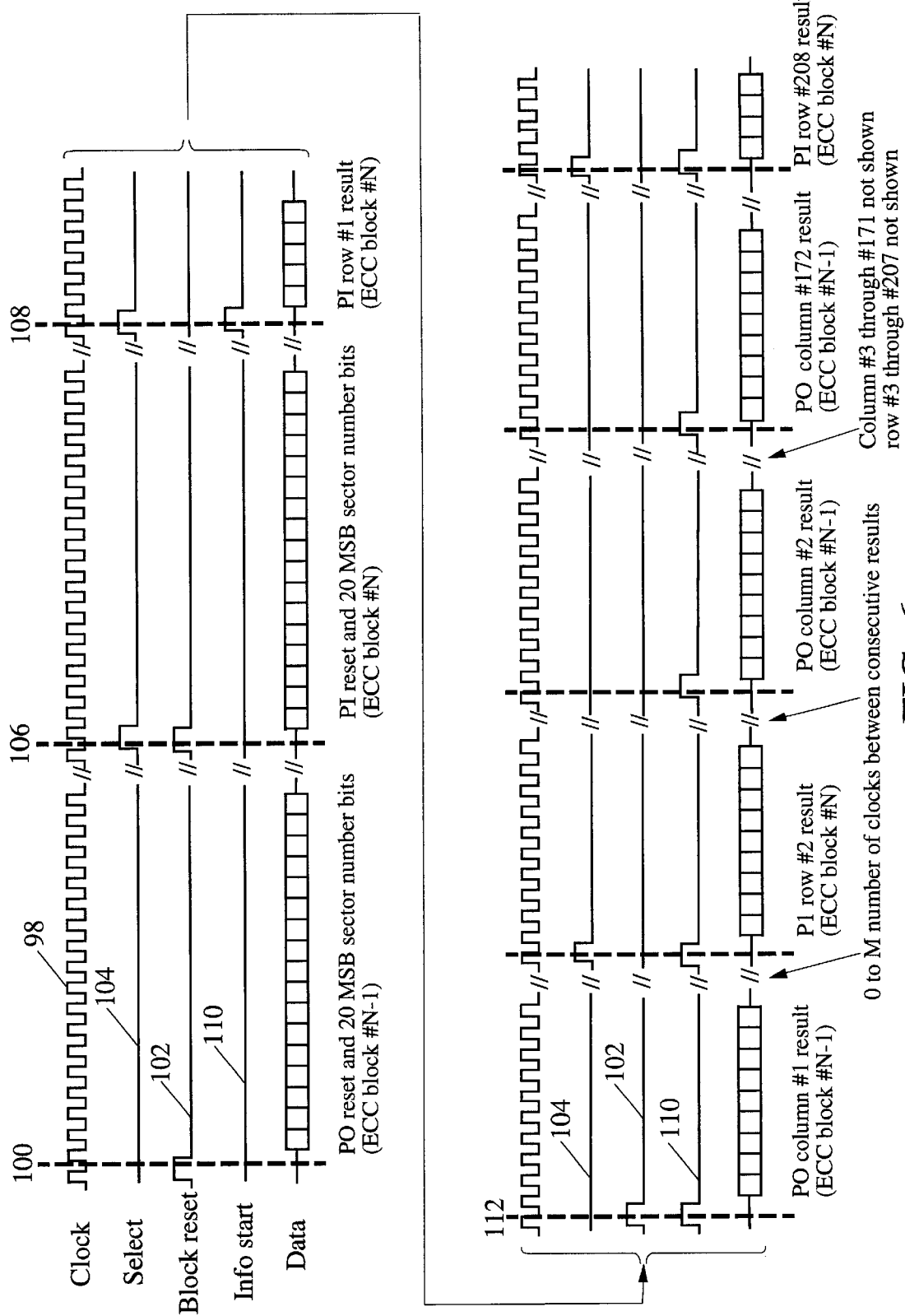
FIG. 6 is a signal transition chart showing the relationship of various signals on the output of one embodiment of the error rate apparatus of FIG. 5.

FIG. 6 is a signal transition chart showing the relationship of various signals on the output of one embodiment of the error rate apparatus of FIG. 5.

Referring to FIG. 5 and FIG. 6, clock signal 98 is provided on clock line 90 as previously seen in FIG. 5.

At time 100, block reset signal 102 is pulsed high for one clock cycle, and select signal 104 is low, the signals together indicating that the next data information to be transferred is the block ID for the PO data to follow. Data is transmitted, one bit per clock cycle, on data lines 86, giving the receiving device the ID data.

At time 106, block reset signal 102 is raised high, as is select signal 104, the signals together indicating that the next set of PI data will pertain to the block ID transferred immediately thereafter.

At time 108, select signal 104 is raised high, as is info start signal 110, indicating that the transfer of a PI data structure will follow.

At time 112, select signal 104 is low, and info start signal 110 is high, indicating that a transfer of a PO data structure will follow.

The transfer of data proceeds as outlined until all PO data for a given block, and the PI data for the succeeding block has been transferred. Although all PI data is received sequentially, and all PO data is received sequentially, PI data and PO data may be mixed in any combination. For instance, PI data corresponding to block number 0x35201H will be transmitted sequentially beginning at line 0 and ending at line 207, but that data may be intermixed with PO data from block number 0x35200H. The intermixed PO data is also transmitted sequentially beginning at column 0 for each line, and ending at column 181 for each line, moving to the next column, and so on.

The previous example assumed that correctable errors were present following the correction of PI data, and therefore, there would be PO error rate information. However, it is possible that all errors which were present during the analysis of PI data were corrected. In this instance, processor 32 doesn't send PO correction data. However, any external device which receives data from error rate apparatus 34 needs PO data information. Therefore, error rate apparatus sends internally generated data which tells external devices that all of the PO data is correct and no further corrections are required.

Several methods exist for determining when all PI data is corrected. One method is to track all PI data structures. If all PI data structures, as seen in FIG. 4, contain $X0XXXXX_2$, where the X's indicate any bit value, all data has been corrected, and there are no further corrections to be made. Thus, no PO error information need be transmitted. A second method involves a signal sent from processor 12 to error rate apparatus 34 on optional signal line 114. Those of ordinary skill in the art will appreciate that many other methods for signaling to error rate apparatus 34 that all data has been corrected, without departing from the scope or purpose of the present invention.

A second alternative condition may exist where there are so many errors that all of the data for a given ECC block is uncorrectable. In this case, PO data need not be examined, if the determination of uncorrectability was made while PI data for that block was being examined. According to one DVD specification, more than sixteen instances of a row of data having more than five errors in a given sector means that the PO data correction is not possible. If the processor 12 determines that more than the acceptable numbers of errors exist during PI correction, it may signal, by asserting optional signal line 116 (in FIG. 5), that error rate apparatus 34 needs to generate internally generated PO error codes. These PO error codes would include $X110000_2$, indicating that the column data is uncorrectable, but that the actual number of errors is unknown.

Those of ordinary skill in the art will readily recognize that there may be one or more clock cycles wherein no data is transferred, or there may instead be no "idle" clock cycles, depending on the timing of the arrival of data at the input of error rate apparatus 34.

Figure 7:
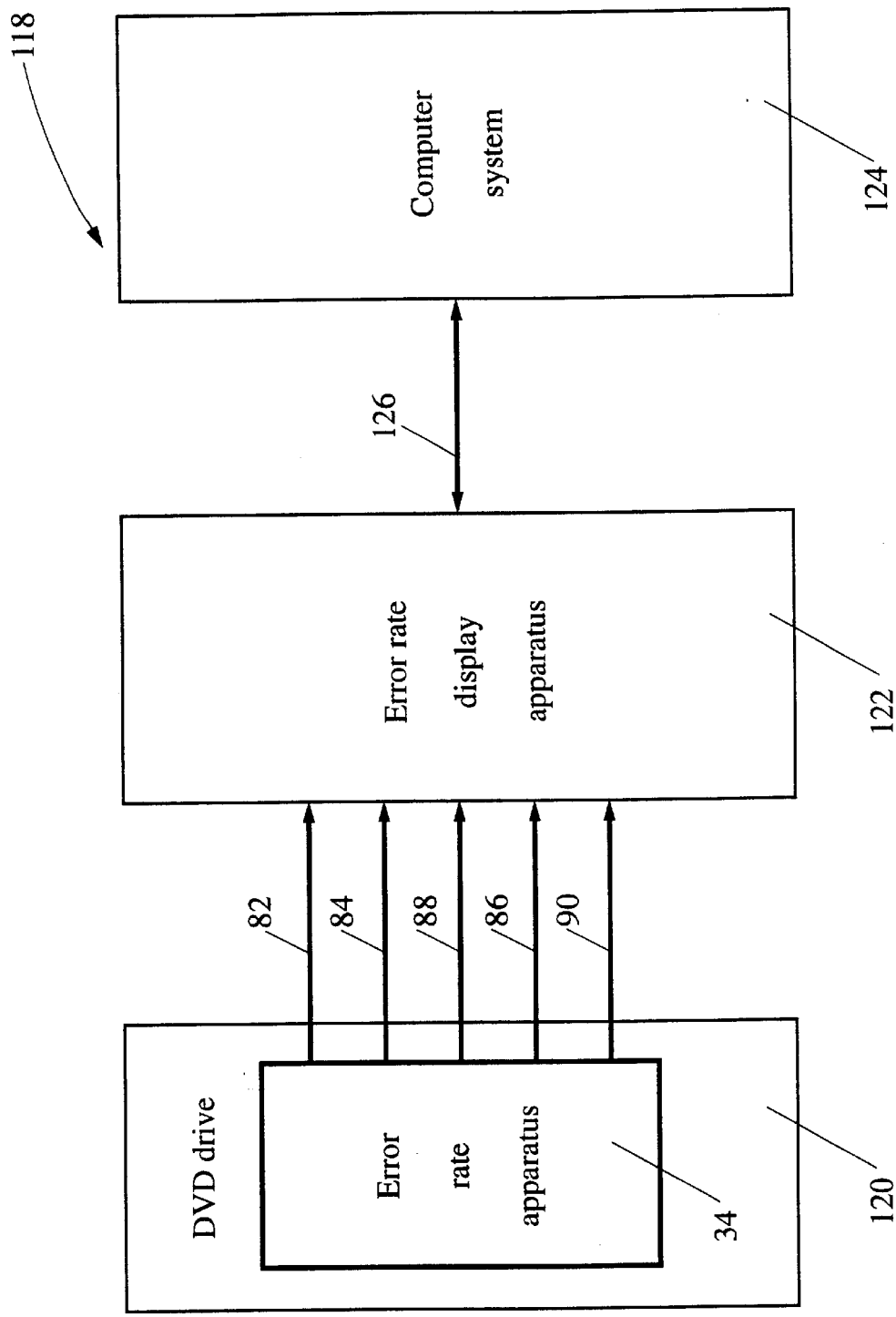
FIG. 7 is a block diagram of an electronic system employing the present invention error rate apparatus.

FIG. 7 is a block diagram of an electronic system employing the present invention error rate apparatus.

Referring to FIG. 7, system 118 includes DVD Drive 120, display apparatus 122, and optional computer system 124. Drive 120 includes error rate apparatus 34 of FIG. 5.

Computer system 124 may or may not be required, depending on the specific analysis desired by a designer and user of the system. Those of ordinary skill in the art would readily recognize that signal lines 126 may be designed to accommodate any known computer communications protocols, such as RS-232.

FIG. 8 is a block diagram showing details of the error-rate display apparatus of FIG. 7.

Display apparatus 122 includes data processing apparatus 130, displays 132, 134, 136, 138, and 140, LED 142, and registers 144, 146, 148, and 150. Registers 144, 146, 148 and 150 are provided so that the number of errors and uncorrected rows and columns may be tracked for each group of ECC blocks. In the described embodiment, register 144 and display 134 each relate to the number is PI errors corrected for a given group. Correspondingly register 146 and display 136 relate to the number of PI rows which were uncorrectable, register 148 and display 138 relate to the number of PO errors corrected, and register 150 and display 140 relate to the number of PO columns having uncorrectable data.

Display apparatus 122 is utilized so that a human user of the system may know the reliability of data being received from DVD drive 112. The speed of DVD drives is generally related to a standard speed known to those of ordinary skill in the art. Therefore, a 1X drive is receiving and processing data at the standard speed, and a 4X drive receives and processes data at four times the standard speed.

At the standard speed, a typical ECC block will be read and processed every 23.7 ms. If the data corresponding to individual blocks were displayed, the displays would change too rapidly for a user to make any meaningful use of the data. Therefore, display apparatus 130 tracks error data for groups of ECC blocks. Such groups may be 50, 100, 200, or 400 blocks in size, or may be other sizes, depending on individual needs. In the example which follows, it is assumed that the size of block groups being processed and displayed is 100 blocks.

Data processing apparatus 130 includes data tracker 152, display manager 154, and error analyzer 156.

When a block reset occurs as described in FIG. 6, data tracker 152 determines if the current block is the first block in a new group of 100 blocks. If so, the block number displayed by display 132 is updated to reflect the most significant digits of the first block of the current group of 100 blocks. The display may present numerical information in any format desired by the user, such as hexadecimal, binary, or decimal. However, the current industry preference for discussing and presenting block numbers is hexadecimal.

If the display is designed to provide information in the industry-preferred hexadecimal format, a "0" may be hard coded to be displayed as the least significant digit, if the user desires that the sector number of the first block be displayed, rather than the block number. The 20-bit block number transmitted following a block reset signal is displayed as the five most hexadecimal digits of the sector number.

If the current block is the first block in a group, registers 144, 146, 148 and 150 are initialized to zero, and the respective ones of displays 134, 136, 138, and 140 are updated by display manager 146.

As PI and PO data is received from error rate apparatus 34 by data tracker 152, the character of the data is determined by error analyzer 156 as discussed with respect to FIG. 6, and the proper register is updated. For example, if the incoming data reflects PO information which indicates that a given number of errors were correctable and therefore corrected, error analyzer would retrieve the current value of register 148, increment that value by "1", restore that new value in register 148. The display manager would then display the new value on display 138.

In a like manner, if the incoming data reflects a PI information which indicates that a given number of errors were correctable and therefore corrected, that number is added, using error analyzer 156, to the current value of register 144, and subsequently displayed on display 134.

Registers 146 and 150, together with displays 136 and 140, relate to the number of PI rows and the number of PO rows having uncorrectable errors respectively.

Optional communications manager 158 is provided in order to interface data processing apparatus 130 to an external computer or other microprocessor-based device for more detailed analysis of error data, if desired. For example, a manufacturer may wish to know the error content of data stored on a particular area of a DVD media. Employing an external computer would allow that manufacturer to store error data specific to that region of the media, and then display the associated error information on a row, column, sector, or block level.

Alternative embodiments of the display apparatus 122 disclosed herein include a switching means which would allow an operator of the system to select, using software or hardware, a custom number of blocks to include in a group.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for processing data read from a DVD media containing stored data, the method comprising:

reading actual data from a DVD media;

computing a first correction code for said actual data;

reading a second correction code from the DVD media, said second correction code pertaining to said stored data;

comparing said first correction code to said second correction code to determine whether said actual data needs to be corrected;

determining whether the number of errors in said actual data exceeds the number of errors that can be corrected;

correcting, if said number of errors in said actual data does not exceed the number of errors that can be corrected, said actual data;

counting the number of errors in said actual data that are corrected; and forming a data structure, relating to the actual data and comprising:

at least one bit indicating whether errors in said actual data were corrected in the correcting step; and at least two bits indicating the number of errors corrected in the actual data.

2. The method of claim 1, further comprising choosing said at least two bits to be at least five bits.

3. A DVD processing apparatus comprising:

means for reading actual data from a DVD media;

means for computing a first correction code for said actual data;

means for reading a second correction code from the DVD media, said second correction code pertaining to said stored data;

means for comparing said first correction code to said second correction code to determine whether said actual data needs to be corrected;

means for determining whether the number of errors in said actual data exceeds the number of errors that can be corrected;

means for correcting, if said number of errors in said actual data does not exceed the number of errors that can be corrected, said actual data;

means for counting errors in said actual data that are corrected; and counting means that provides at least one of (i) at least one bit indicating whether errors in the actual data where corrected by the correcting means and (ii) at least two bits indicating number of errors corrected in the actual data.

4. The apparatus of claim 3, wherein said counting means provides at least five bits indicating said number of errors corrected in said actual data.

* * * * *